United States Patent
Richardson, Jr.

(10) Patent No.: US 8,413,670 B1
(45) Date of Patent: Apr. 9, 2013

(54) ANIMAL UMBRELLA

(76) Inventor: Aubrey C. Richardson, Jr., North Las Vegas, NV (US)

(*) Notice: Subject to any disclaimer, the term of this patent is extended or adjusted under 35 U.S.C. 154(b) by 0 days.

(21) Appl. No.: 13/470,689

(22) Filed: May 14, 2012

(51) Int. Cl.
*A45B 11/02* (2006.01)
*A45B 25/18* (2006.01)
*A01K 27/00* (2006.01)
*A01K 13/00* (2006.01)

(52) U.S. Cl.
USPC ........... 135/16; 135/33.2; 135/15.1; 119/792; 119/850

(58) Field of Classification Search .......... 135/15.1, 135/16, 20.1, 25.4, 33.2, 33.41, 98, 159; 119/792, 795, 769, 850, 856
See application file for complete search history.

(56) References Cited

U.S. PATENT DOCUMENTS

| | | | |
|---|---|---|---|
| 3,267,905 A * | 8/1966 | Fleming | 119/795 |
| D324,117 S * | 2/1992 | Antoine | D30/144 |
| 5,918,611 A | 7/1999 | Amato | |
| 6,871,616 B2 | 3/2005 | Zhadan-Milligan et al. | |
| 7,021,246 B2 | 4/2006 | Seymour | |
| 7,036,519 B2 | 5/2006 | Godshaw et al. | |
| 2006/0231129 A1* | 10/2006 | Ferraro et al. | 135/135 |
| 2008/0289586 A1* | 11/2008 | O'Connor | 119/850 |

* cited by examiner

*Primary Examiner* — David Dunn
*Assistant Examiner* — Danielle Jackson

(57) ABSTRACT

An animal umbrella that includes a thoracic vest having a releasably fastenable front seam, a neck hole, a first foreleg hole, a second foreleg hole, and a base unit centrally disposed atop a dorsal portion, with an umbrella unit having an elongated dome-shaped covering, the covering having a mount support centrally disposed in an arched top portion, wherein a hoop stand removably inserts through the mount support to releasably attach to the base unit and a lock member slidingly secures the canopy at a desired height above the base unit to shield a quadruped from inclement weather and, alternately, shade the quadruped from intense sunlight, as desired.

10 Claims, 3 Drawing Sheets

ANIMAL UMBRELLA

BACKGROUND OF THE INVENTION

Various types of animal umbrellas are known in the prior art. However, what is needed is an animal umbrella that includes a thoracic vest having a releasably fastenable front seam, a neck hole, a first foreleg hole, a second foreleg hole, and a base unit centrally disposed atop a dorsal portion, with an umbrella unit having an elongated dome-shaped covering, the covering having a mount support centrally disposed in an arched top portion, wherein a hoop stand removably inserts through the mount support to releasably attach to the base unit and a lock member slidingly secures the canopy at a desired height above the base unit to shield a quadruped from inclement weather and, alternately, shade the quadruped from intense sunlight, as deisred.

FIELD OF THE INVENTION

The present invention relates to an animal umbrella, and more particularly, to an animal umbrella that includes a thoracic vest having a releasably fastenable front seam, a neck hole, a first foreleg hole, a second foreleg hole, and a base unit centrally disposed atop a dorsal portion, with an umbrella unit having an elongated dome-shaped covering, the covering having a mount support centrally disposed in an arched top portion, wherein a hoop stand removably inserts through the mount support to releasably attach to the base unit and a lock member slidingly secures the canopy at a desired height above the base unit to shield a quadruped from inclement weather and, alternately, shade the quadruped from intense sunlight, as deisred.

SUMMARY OF THE INVENTION

The general purpose of the animal umbrella, described subsequently in greater detail, is to provide an animal umbrella which has many novel features that result in an animal umbrella which is not anticipated, rendered obvious, suggested, or even implied by prior art, either alone or in combination thereof.

Walking domesticated animals is a duty incumbent many pet owners, many of whom keep regular working schedules and keep indoor pets. For many such pet owners, the time for walks is limited to specific hours in the day, around a work schedule, leaving no choice to avoid inclement weather. Wherefore an animal umbrella is warranted, to keep pets dry in inclement weather, and alternately shade pets from intense sunlight in hot and arid climates. During rainy weather, particularly, returning wet pets to an indoor environment is inconvenient. An animal umbrella, easily fittable to a quadruped such as a domestic dog (*canis domesticus*), is warranted.

While animal umbrellas are evinced in the prior art what is needed is an animal umbrella including a thoracic vest, said vest fittable over the thorax of a quadruped. The present invention includes a thoracic vest and a lightweight, readily portable umbrella unit. The thoracic vest of the present invention includes a neck hole, a first foreleg hole, a second foreleg hole, a dorsal portion, and a releasably fastenable front seam. Each of the first foreleg hole and the second foreleg hole are generally ovoid in shape enabling a fit around a quadruped's forelegs and shoulders whereby the locomotion of the quadruped is uninhibited.

The thoracic vest of the present animal umbrella is releasably fastenable around the thorax of a quadruped by means of a hook and loop fastener disposed lengthwise along the front seam. When fitted to an animal, the front seam overlies the prosternum, forechest, and sternum of the animal. The dorsal portion is disposed atop the thorax, from the neck, over the withers, terminating upon the back of the quadruped before the croup. The thoracic vest is envisioned to be manufactured from a durable material and may also provide for additional warmth in cold climates.

A base unit is centrally disposed upon the dorsal portion. The base unit includes a clip mechanism and a pair of release buttons. The umbrella unit is releasably attachable to the thoracic vest by means of the base unit, as will be detailed subsequently.

The umbrella unit, releasably attachable to the thoracic vest, includes an elongated dome-shaped covering made of a lightweight, preferably polymeric material. The canopy includes an arched top portion, an inside surface, an outside surface, and an outer rim. A generally elliptical mount support is centrally disposed in the top portion, and a pair of holes are disposed along the semi-major axis of the mount support. The covering may be transparent, for use as an umbrella, and alternately opaque, for use as a parasol.

An elongated U-shaped hoop stand is included, the hoop stand having a top section and a pair of legs distending therefrom. Each of the pair of legs is removably insertable through the pair of holes in the mount support. The pair of legs releasably attaches with the base unit, each of the pair of legs releasably engaging with the clip mechanism. The hoop stand is disposed perpendicularly with respect to the base unit when releasably inserted thereto.

When the pair of legs are inserted into the base unit the pair of release buttons are extended laterally. To remove the hoop stand from the base unit, the pair of release buttons is depressed, the clip mechanism disengages with the hoop stand, and the hoop stand is released from the base unit.

A lock member is removably insertable around the pair of legs of the hoop stand. The lock member is slidingly securable upon the pair of legs. The lock member slidingly engages with the inside surface of the mount support to hold the covering at a desired height above the back of the quadruped to which the device is fitted for use. The lock member slidingly secures the covering at a desired height above the base unit, and the canopy is secured, upon the hoop stand, with a long axis disposed at an acute angle with respect to the spine of the quadruped to which the device is fitted for use. The canopy, thusly fitted to the thoracic vest, is thereby disposed to accommodate the animal's head, with the top portion sloped downwards towards the animal's rear.

The hoop stand thusly is inserted through the pair of holes, through the lock member, and then releasably attached to the base unit. When fitted to an animal, the top section of the hoop stand is disposed above the outside surface of the canopy. An extant leash is attachable to the hoop stand top section, as desired, for walking the animal wearing the instant animal umbrella.

Thus has been broadly outlined the more important features of the present animal umbrella so that the detailed description thereof that follows may be better understood and in order that the present contribution to the art may be better appreciated.

Objects of the present animal umbrella, along with various novel features that characterize the invention are particularly pointed out in the claims forming a part of this disclosure. For better understanding of the animal umbrella, its operating

BRIEF DESCRIPTION OF THE DRAWINGS

Figures

DETAILED DESCRIPTION OF THE DRAWINGS

Figure 1:
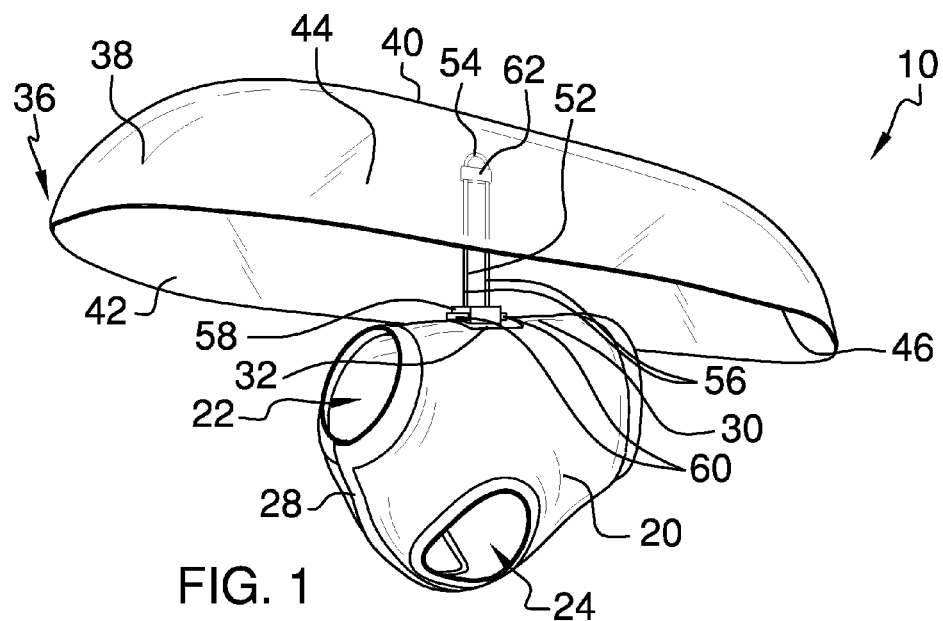
FIG. 1 is an isometric view.
Figure 2:
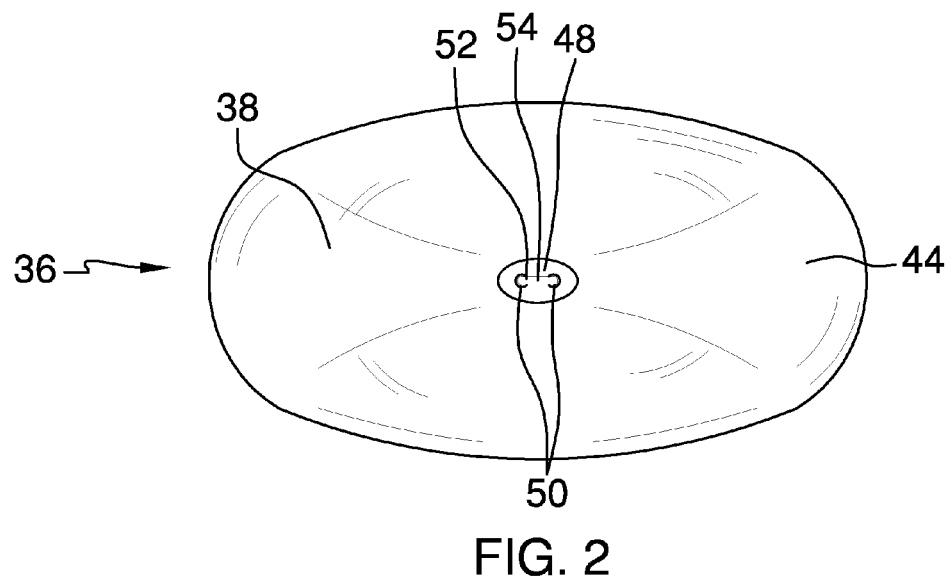
FIG. 2 is a top view.

With reference now to the drawings, and in particular FIGS. 1 through 5 thereof, example of the instant animal umbrella employing the principles and concepts of the present animal umbrella and generally designated by the reference number 10 will be described.

Referring to FIGS. 1 through 5 a preferred embodiment of the present animal umbrella 10 is illustrated.

The present animal umbrella 10 herein disclosed is devised for use with quadrupeds—primarily dogs (*canis domesticus*). However, larger or smaller versions of the device 10 are considered, and the device is not intended to be limited for use with dogs. The preferred embodiment herein disclosed is shown fitted to a dog, but the term "quadruped", as applied herein, is inclusive of other domestic animals for which such a device 10 may be desirable.

The animal umbrella 10 includes a thoracic vest 20 configured to fit upon a quadruped 70. The thoracic vest 20 includes a neck hole 22, a first foreleg hole 24, a second foreleg hole 26, a releasably fastenable front seam 28, a dorsal portion 30, and a base unit 32 centrally disposed upon the dorsal portion 30. The first foreleg hole 24 and the second foreleg hole 26 are generally ovoid in shape for comfort and to accommodate the movement of the forelegs 80 of the quadruped 70 without inhibiting locomotion.

Figure 5:
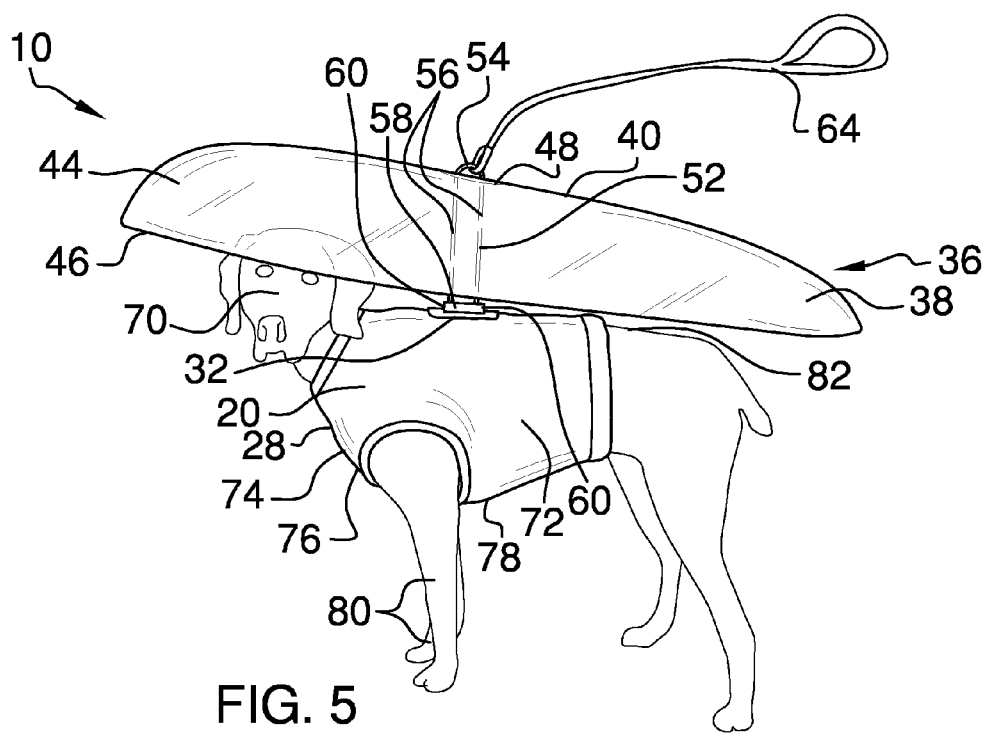
FIG. 5 as in in-use view.

The thoracic vest 20 releasably encloses a quadruped 70 thorax 72 with the front seam 28 overlying the prosternum 74, forechest 76, and sternum 78 of the quadruped 70 (see FIG. 5). The front seam 28 is releasably fastenable by means of a hook and loop fastener 34 disposed upon the front seam 28 (see FIG. 3). The thoracic vest 20 is envisioned to be made of a lightweight, durable, material, but embodiments are considered wherein the thoracic vest is configured to provide warmth for the animal for use in cold climates.

An umbrella unit 36 is releasably attachable to the thoracic vest 20. The umbrella unit 36 includes an elongated dome-shaped covering 38. The covering 38 is envisioned to be made of a lightweight, polymeric material, and comprises an ached top portion 40, an inside surface 42, an outside surface 44, an outer rim 46, and a mount support 48 centrally disposed in the arched top portion 40. The mount support 48 is manufactured from a durable, preferably polymeric material. In the preferred embodiment herein disclosed, the mount support 48 is generally elliptical in shape. A pair of holes 50 is disposed in the mount support 48 along the semi-major axis of the mount support 48.

An elongated, generally U-shaped hoop stand 52 is included. The hoop stand 52 includes a top section 54 and a pair of legs 56. Each of the pair of legs 56 of the hoop stand 52 is removably insertable through the pair of holes 50 in the mount support 48, and each of the pair of legs 56 is releasably attachable to the base unit 32. Each of the pair of legs 56 releasably attaches into the base unit 32, the base unit 32 engaging with each of the pair of legs 56 by means of a clip mechanism 58.

Figure 3:
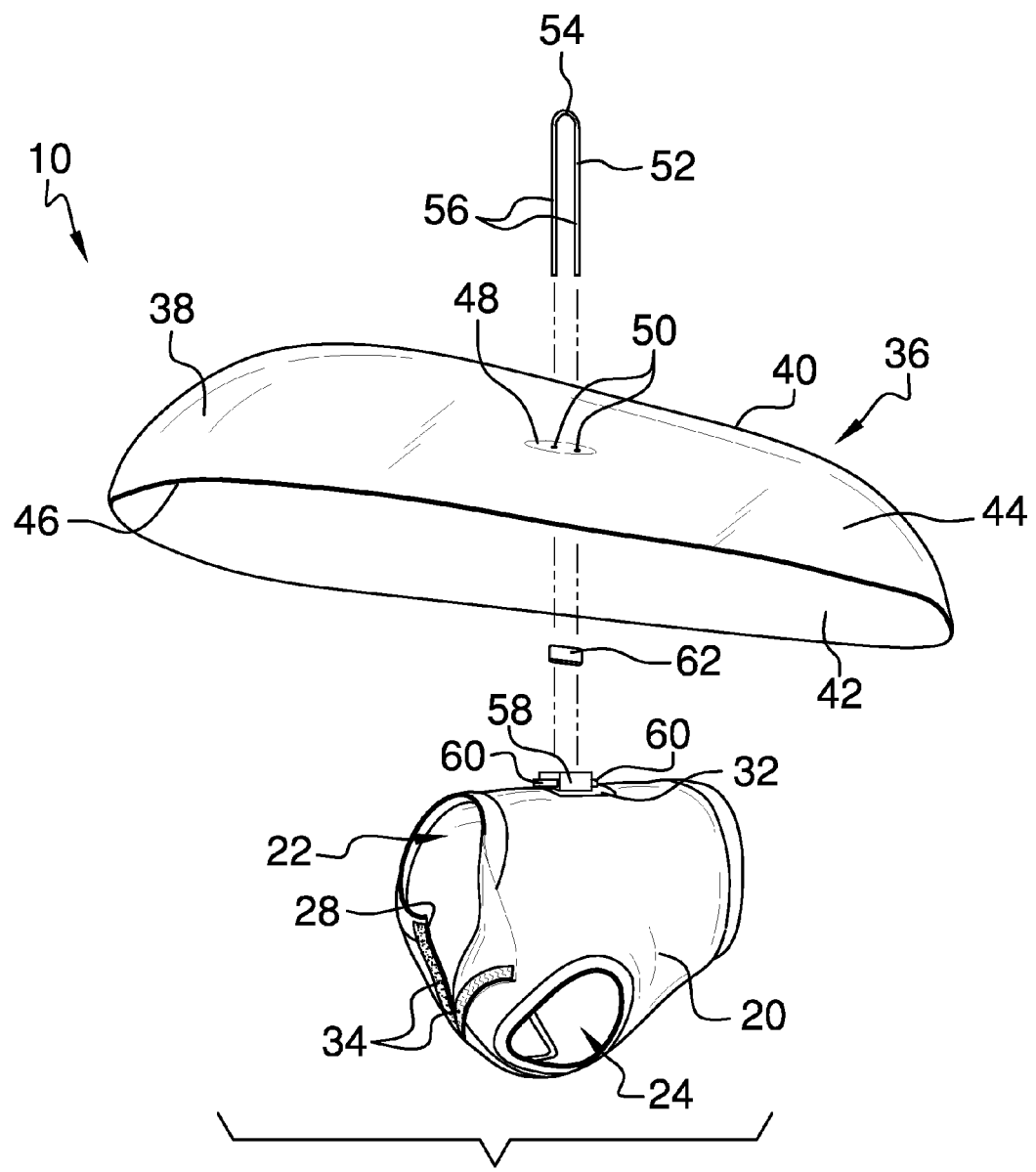
FIG. 3 is an exploded view.
Figure 4:
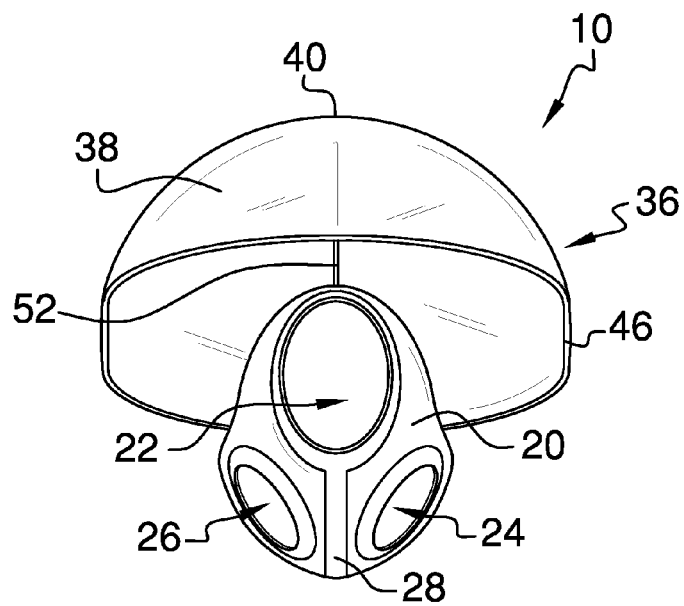
FIG. 4 is a front view.

When releasably attached to the base unit 32, the hoop stand 52 is disposed vertically upwards from the base unit 32 (see FIGS. 1, 3 and 5). When the hoop stand 52 is releasably attached to the base unit 32 a pair of release buttons 60 are extended laterally from the clip mechanism 58. To remove the hoop stand 52, each of the pair of release buttons 60 is pressed inwards, the clip mechanism 58 is disengaged from each of the pair of legs 56, and the hoop stand 52 may be removed from the base unit 32.

A lock member 62, releasably insertable around the hoop stand 52, is positionable proximal the hoop stand 52 top section 54 to releasably secure the covering 38 atop the hoop stand 52. The lock member 62 prohibits the covering 38 from sliding down the pair of legs 56 of the hoop stand 52. The lock member 62, therefore, maintains the covering 38 at a desired height above the base unit 32, and thusly over a quadruped 70 wearing the device 10 (see FIG. 5).

Each of the pair of legs 56 of the hoop stand 52 is removably inserted first through the pair of holes 50 in the mount support 48, then into the lock member 62, and finally releasably attached to the base unit 32 (see FIG. 3). The lock member 62 is slidingly positioned to engage with the inside surface 42 of the mount support 48. The hoop stand 52 top section 54 is thereby disposed through the mount support 48 above the outside surface 44 of the mount support 48. An extant leash 64 is attachable to the top section 54 of the hoop stand 52, as desired, when using the animal umbrella 10.

The covering 38 of the umbrella unit 36 has a longitudinal axis disposed overlying the spine 82 of a quadruped 70 wearing the device 10. This longitudinal axis is disposed at an acute angle relative the spine 82 of the quadruped 70 when mounted to the hoop stand 52—the lock member 62 engaging with the inside surface 42 of the mount support 48 to maintain this angular position. Thusly, the covering 38 accommodates the head of a quadruped 70 wearing the device 10, and the top portion 40 is sloped downwards towards the rear of the quadruped 70.

What is claimed is:
1. An animal umbrella comprising:
  a thoracic vest configured to fit upon a quadruped, the thoracic vest comprising:
    a neck hole;
    a first foreleg hole;
    a second foreleg hole;
    a releasably fastenable front seam;
    a dorsal portion;
    a base unit disposed upon the dorsal portion;
  an umbrella unit comprising:
    an elongated dome-shaped covering, the covering comprising:
      an ached top portion;
      an outer rim;
      an inside surface;
      an outside surface;
    a mount support centrally disposed in the arched top portion;
    a pair of holes disposed in the mount support;
    a U-shaped hoop stand releasably insertable through the pair of holes and releasably attachable to the base unit, the hoop stand having a top section and a pair of legs;
    a lock member, releasably insertable around the hoop stand, said lock member positionable proximal the hoop member top section to releasably secure the covering atop the hoop stand;

wherein the thoracic vest releasably encloses a quadruped thorax with the front seam overlying the prosternum, forechest, and sternum of the quadruped; and wherein the umbrella unit is releasably securable to the base unit, whereby an extant leash is attachable to the hoop stand top portion.

2. The animal umbrella of claim 1 wherein the base unit comprises:
a clip mechanism releasably engaging with each of the pair of legs of the hoop stand;
a pair of release buttons;
wherein each of the pair of release buttons is depressible to release each of the pair of legs of the hoop stand when the hoop stand is releasably inserted into the base unit.

3. The animal umbrella of claim 2 wherein the front seam is releasably fastenable by means of a hook and loop fastener disposed lengthwise upon the front seam.

4. The animal umbrella of claim 2 wherein the lock member is slidingly securable upon the hoop stand.

5. The animal umbrella of claim 4 wherein each of the first foreleg hole and the second foreleg hole are generally ovoid in shape.

6. The animal umbrella of claim 4 wherein the lock member abuts the inside surface of the mount support whereby the covering is slidingly moveable and selectively securable at a desired height upon the hoop stand.

7. The animal umbrella of claim 6 wherein the lock member supports the umbrella unit at an acute angle over the spine of a quadruped wearing the device.

8. The animal umbrella of claim 7 wherein the umbrella unit has a longitudinal axis disposed at an acute angle relative the spine of the quadruped when the canopy is mounted to the hoop stand.

9. The animal umbrella of claim 8 wherein the umbrella unit is made of a lightweight polymeric material.

10. An animal umbrella comprising:
a thoracic vest configured to fit upon a quadruped, the thoracic vest comprising:
a neck hole;
a generally ovoid first foreleg hole;
a generally ovoid second foreleg hole;
a releasably fastenable front seam;
a hook and loop fastener disposed lengthwise along the front seam;
a dorsal portion;
a base unit centrally disposed upon the dorsal portion, the base unit comprising:
a clip mechanism;
a pair of depressible release buttons;
an umbrella unit comprising;
an elongated dome-shaped covering, the covering comprising:
an ached top portion;
an outer rim;
an inside surface;
an outside surface;
a mount support centrally disposed in the arched top portion;
a pair of holes disposed in the mount support;
a generally U-shaped hoop stand having a top section and a pair of legs;
wherein the hoop stand is releasably insertable through the pair of holes, and the hoop stand is releasably attachable to the base unit;
a lock member, releasably insertable around the hoop stand, said lock member slidingly securable upon the pair of legs;
wherein the thoracic vest releasably encloses a quadruped thorax with the front seam overlying the prosternum, forechest, and sternum of the quadruped;
wherein the lock member is slidingly securable upon the hoop stand and the lock member abuts the inside surface of the mount support, whereby the covering is slidingly moveable and selectively securable at a desired height upon the hoop stand; and
wherein the umbrella unit is releasably secureable to the base unit, whereby an extant leash is attachable to the hoop stand top portion.

* * * * *